US011670824B2

(12) United States Patent
Oh et al.

(10) Patent No.: US 11,670,824 B2
(45) Date of Patent: Jun. 6, 2023

(54) SECONDARY BATTERY

(71) Applicant: Samsung SDI Co., Ltd., Yongin-si (KR)

(72) Inventors: Dae Sik Oh, Yongin-si (KR); Jun Hyoung Park, Yongin-si (KR); Yong Seok Oh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 166 days.

(21) Appl. No.: 16/749,301

(22) Filed: Jan. 22, 2020

(65) Prior Publication Data

US 2020/0381681 A1 Dec. 3, 2020

(30) Foreign Application Priority Data

May 29, 2019 (KR) .................. 10-2019-0063249

(51) Int. Cl.
*H01M 50/169* (2021.01)
*H01M 50/166* (2021.01)
*H01M 50/529* (2021.01)
*H01M 50/10* (2021.01)
*B23K 9/02* (2006.01)

(52) U.S. Cl.
CPC ......... *H01M 50/169* (2021.01); *H01M 50/10* (2021.01); *H01M 50/166* (2021.01); *H01M 50/529* (2021.01); *B23K 9/0216* (2013.01)

(58) Field of Classification Search
CPC ....... H01M 50/10; H01M 50/102–103; H01M 50/166–169; H01M 50/529
See application file for complete search history.

(56) References Cited

U.S. PATENT DOCUMENTS

| 8,976,508 B2 | 3/2015 | Tamachi et al. |
| 9,583,742 B2 | 2/2017 | Munenaga et al. |
| 2011/0300423 A1* | 12/2011 | Lee ............... H01M 50/10 429/94 |
| 2012/0301779 A1 | 11/2012 | Munenaga et al. |
| 2014/0049878 A1 | 2/2014 | Tamachi et al. |
| 2019/0036088 A1* | 1/2019 | Wakimoto ........ H01M 50/119 |

(Continued)

FOREIGN PATENT DOCUMENTS

| CN | 103503096 A | 1/2014 |
| CN | 109475979 A * | 3/2019 ........... H01M 50/30 |

(Continued)

OTHER PUBLICATIONS

Machine translation of CN 109475979 A (Year: 2019).*

(Continued)

*Primary Examiner* — Matthew T Martin
*Assistant Examiner* — Unique Jenevieve Luna
(74) *Attorney, Agent, or Firm* — Lewis Roca Rothgerber Christie LLP

(57) ABSTRACT

The present disclosure relates to a secondary battery, which can improve the sealing efficiency of a can (or case). The secondary battery includes an electrode assembly; a case configured to accommodate the electrode assembly, the case including a bottom portion, long side portions and short side portions, at least one of which includes a welding portion that is configured to be bent and welded, and a cap plate coupled to the case, wherein a portion of the welding portion is overlap-welded.

7 Claims, 10 Drawing Sheets

(56) References Cited

U.S. PATENT DOCUMENTS

2019/0299332 A1  10/2019  Ogawa
2020/0251692 A1   8/2020  Oh et al.

FOREIGN PATENT DOCUMENTS

| CN | 109475979 A    | 3/2019  |
|----|----------------|---------|
| CN | 111509146 A    | 8/2020  |
| EP | 3690975 A1     | 8/2020  |
| JP | 6-148394 A     | 5/1994  |
| JP | 7-328765 A     | 12/1995 |
| JP | 2015-138701 A  | 7/2015  |
| JP | 6142466 B2     | 6/2017  |
| JP | 2017-200707 A  | 11/2017 |
| KR | 10-2018-0013481 A | 2/2018 |
| KR | 10-1922063 B1  | 11/2018 |

OTHER PUBLICATIONS

EPO Extended European Search Report dated Sep. 18, 2020, issued in corresponding European Patent Application No. 20164076.0 (9 pages).
Chinese Office action dated May 24, 2022, in corresponding Chinese Patent Application No. 202010355230.5, Including English translation (26 pages).
Chinese Office Action dated Jan. 20, 2023, in corresponding Chinese Patent Application No. 202010355230.5, including English translation (17 pages).

* cited by examiner

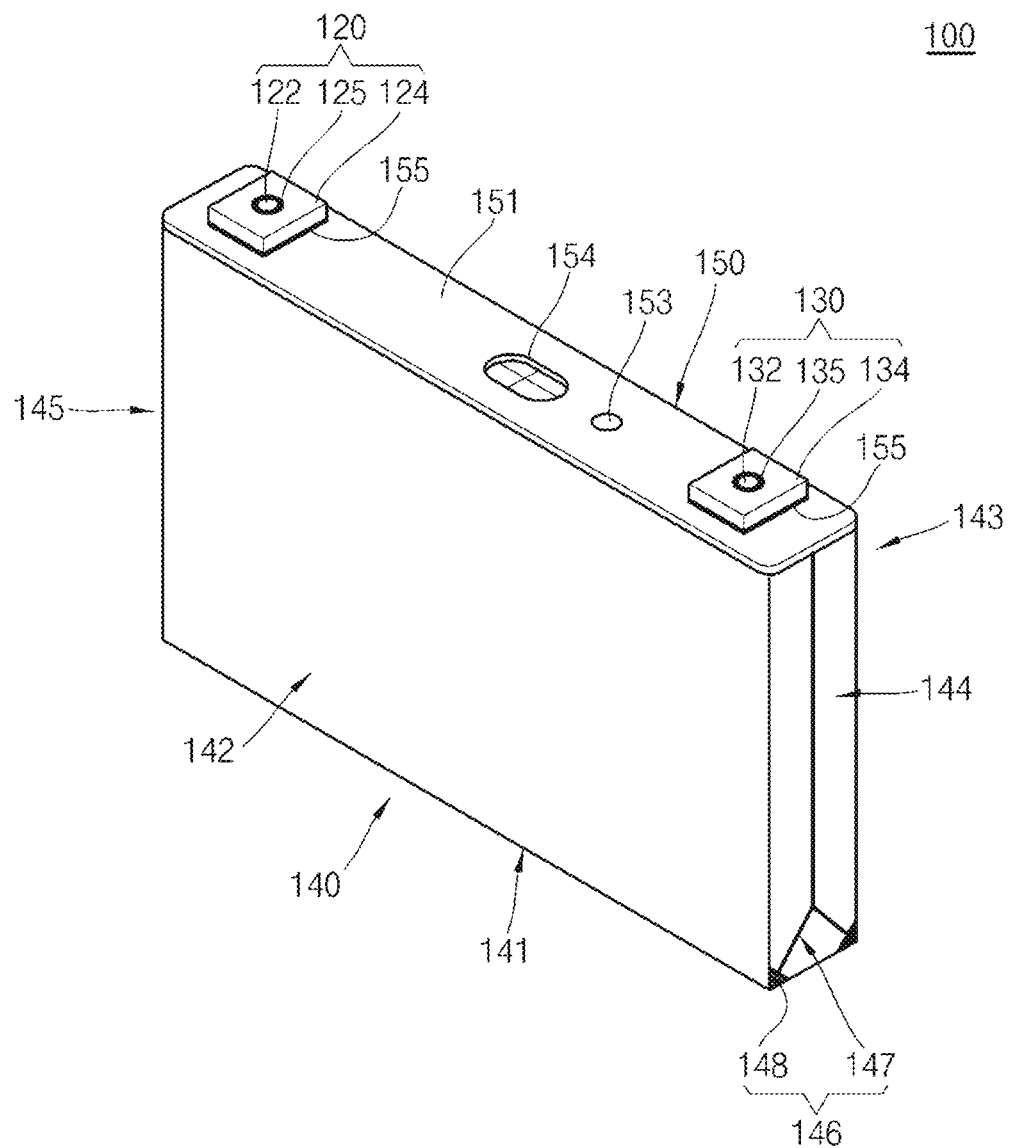

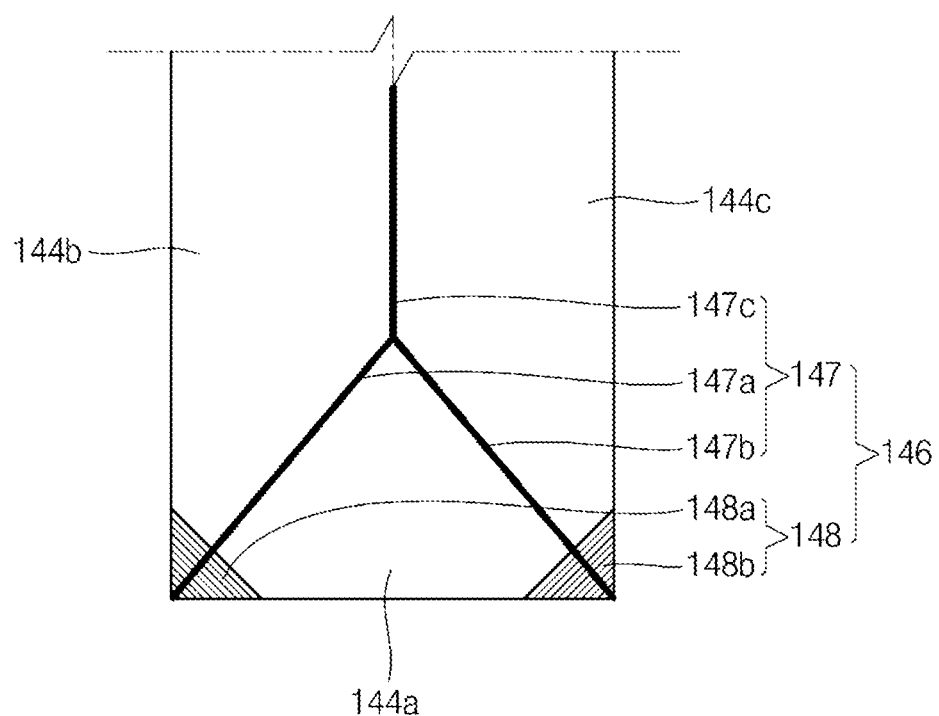

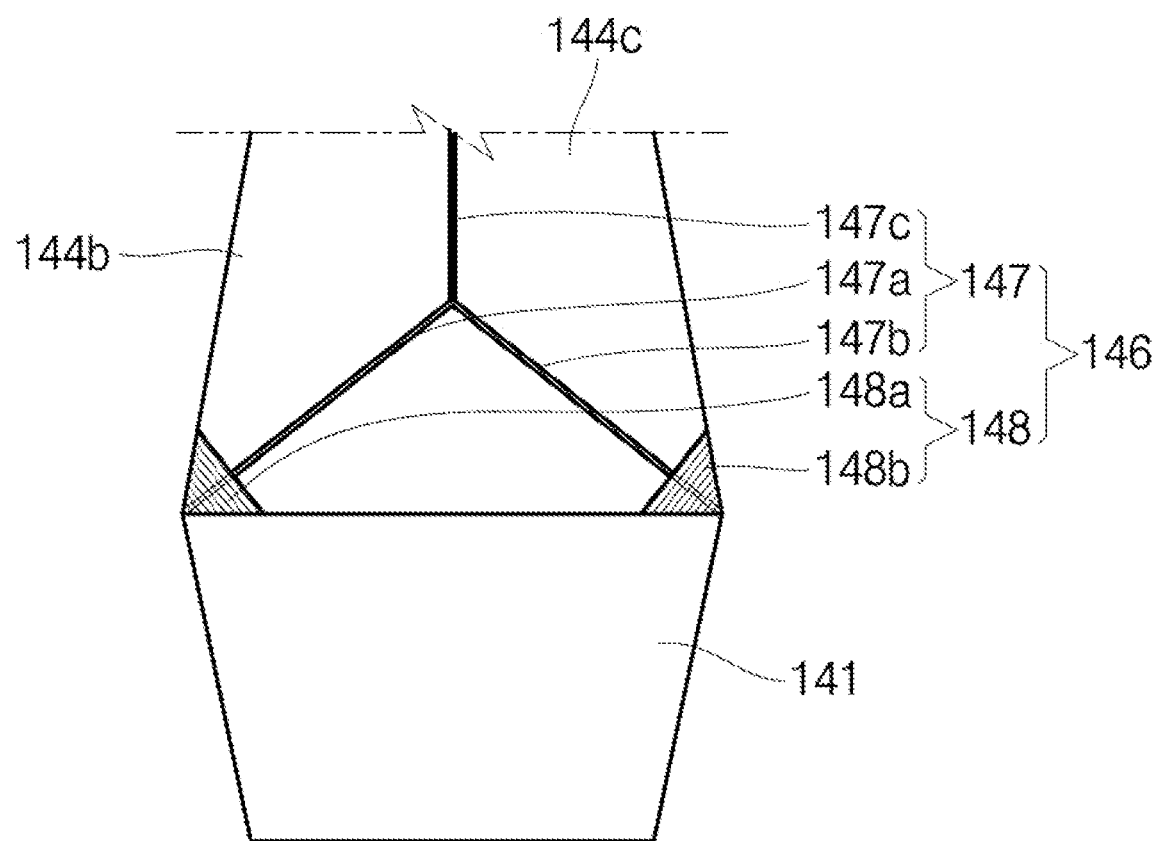

SECONDARY BATTERY

CROSS-REFERENCE TO RELATED APPLICATION

This application claims priority to and the benefit of Korean Patent Application No. 10-2019-0063249 filed on May 29, 2019 in the Korean Intellectual Property Office, the content of which in its entirety is herein incorporated by reference.

BACKGROUND

1. Field

The present disclosure relates to a secondary battery.

2. Description of the Related Art

A battery may be classified as a prismatic battery, a cylindrical battery, a pouch battery, etc., according to the shape of a case. A prismatic or cylindrical battery may be manufactured by inserting an electrode assembly having a positive electrode, a negative electrode and a separator into a metal can (or case) having the corresponding shape and sealing the electrode assembly, while a pouch battery may be manufactured by enclosing an electrode assembly using an aluminum foil coated with an insulator.

Traditional battery can (case or housing) manufacturing methods may include a deep drawing process, an impact process, and/or the like. In an example, the deep drawing process is performed such that a sheet-shaped metal plate is placed on a molding die and punching operations are performed on the metal plate about ten times using a punch, thereby completing the can. In an example, the impact process is performed such that a slug in the form of a billet is placed on a molding die and a strong punching operation is performed on the slug about one time using a punch, thereby competing the can. The impact process can reduce the number of processing steps, thereby lowering the manufacturing cost.

However, the related art deep drawing process and the related art impact process are both limited in reducing a can thickness due to the respective manufacturing process characteristics and reveal a big deviation in the thickness of the can according to the area of the can. In addition, the related art deep drawing process and the related art impact process are problematic in that the manufacturing cost of the battery can is quite high.

The above information disclosed in this Background section is only for enhancement of understanding of the background of the described technology and therefore it may contain information that does not form the prior art that is already known in this country to a person of ordinary skill in the art.

SUMMARY

One or more aspects of embodiments of the present invention are directed toward a secondary battery, which can improve the sealing efficiency of a can.

According to embodiments of the present invention, there is provided a secondary battery including an electrode assembly, a case configured to accommodate the electrode assembly, the case including a bottom portion, long side portions and short side portions, at least one of which includes a welding portion and is bent and welded, and a cap plate coupled to the case, wherein a portion of the welding portion is an overlap-welded portion.

The overlap-welded portion may include a plurality of overlap-welded portions spaced apart from each other.

The welding portion may include main welding portions and auxiliary welding portions overlapped with portions of the main welding portions.

The long side portions may be bent and extended from the bottom portion, and each of the short side portions may be configured by combining a first short side portion bent and extended from the bottom portion and second and third short side portions extending from a respective one of the long side portions.

The main welding portions may include a first welding portion located between the first short side portion and the second short side portion, a second welding portion located between the first short side portion and the third short side portion, and a third welding portion located between the second short side portion and the third short side portion.

The auxiliary welding portions may include a fourth welding portion. located across the first welding portion and a fifth welding portion located across the second welding portion.

The auxiliary welding portions may be respectively located at a corner of the case, where the first short side portion and the second short side portion meet, and at a corner of the case, where the first short side portion and the third short side portion meet.

The auxiliary welding portions may include multiple welding lines.

The auxiliary welding portions may each be formed by overlay-welding a metal wire to a portion of the corresponding main welding portion.

The main welding portions may be welded as line welds and the auxiliary welding portions may be welded as side welds.

The welding portion may include a plurality of welding portions respectively located at bottom corners of the short side portions.

A method of manufacturing the secondary battery includes providing the electrode assembly; accommodating the electrode assembly in the case, the case including a bottom portion, long side portions, and short side portions; bending the at least one of the long side portions and short side portions; overlap-welding the at least one of the long side portions and short side portions at the welding portion; and coupling the cap plate to the case.

As described above, the secondary battery according to an embodiment of the present invention can improve the sealing efficiency of a case by removing (or reducing) internal pores and welding cracks by overlap-welding (dual welding) corners in short sides of the case.

BRIEF DESCRIPTION OF THE DRAWINGS

FIG. 1 is a perspective view illustrating an example secondary battery according to an embodiment of the present invention.

FIGS. 4A and 4B are side views illustrating an example method for manufacturing example secondary batteries.

FIG. 5 is a photograph illustrating a case of an example secondary battery.

DETAILED DESCRIPTION

Figure 2A:
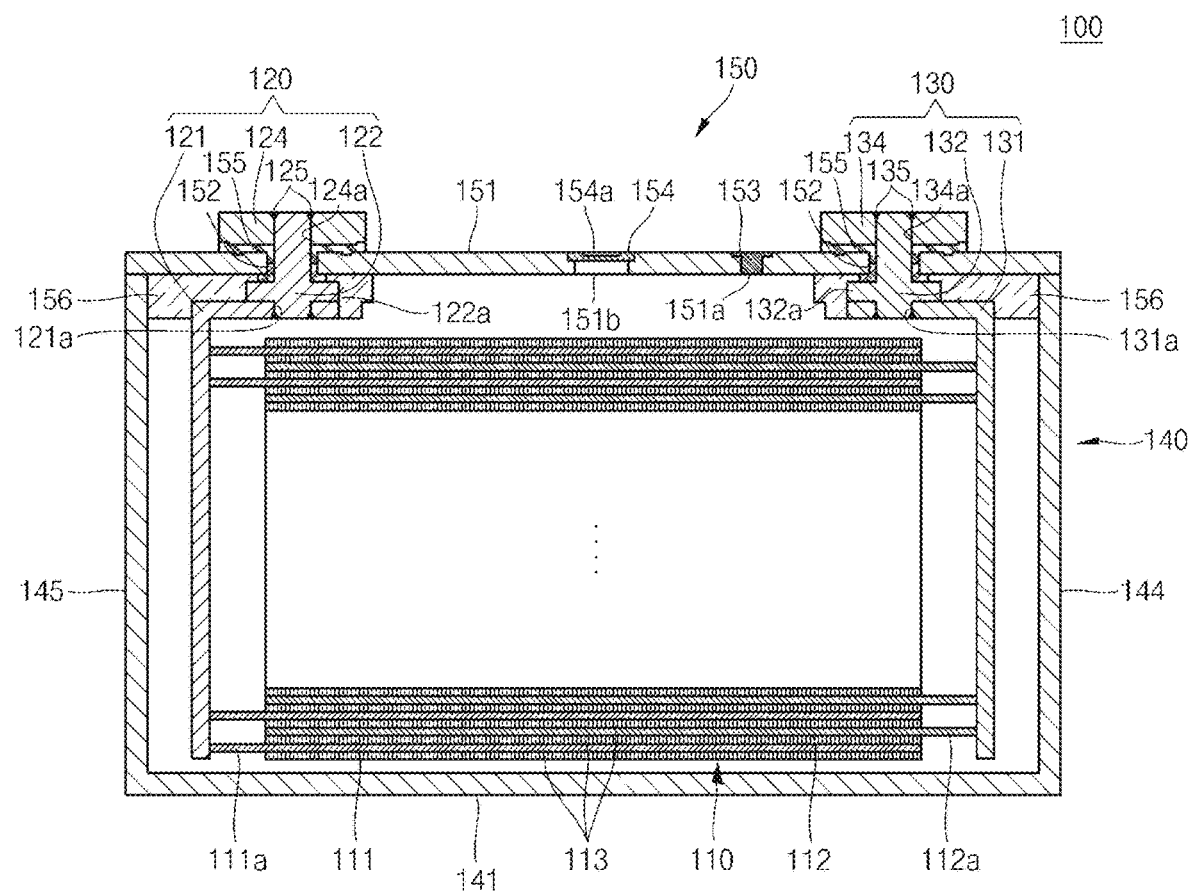
FIGS. 2A and 2B are cross-sectional views illustrating example secondary batteries.

Hereinafter, preferred embodiments of the present invention will be described in more detail.

However, it will be understood that various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components may be exaggerated for brevity and clarity. Like numbers refer to like elements throughout. In addition, it will be understood that when an element A is referred to as being "connected to" an element B, the element A can be directly connected to the element B or one or more intervening elements C may be present, and the element A and the element B may then be indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms "first," "second," etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the example term "below" can encompass both an orientation of above and below.

Meanwhile, the term "welding portion" used throughout this specification can be referred to as a "temporary welding portion and/or a welding portion" in some cases, which is for representing the welding sequence and function but is not intended to limit the invention. In addition, the term "welding" as used herein mainly refers to laser welding, and examples of laser used for welding may include, but not limited to, CO2 laser, fiber laser, disk laser, semiconductor laser and/or yttrium aluminum garnet (YAG) laser. In addition, the terms "second short side portion" and "third short side portion" can be collectively referred to as "second short side portions," in some cases.

Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

FIG. 1 is a perspective view illustrating an example secondary battery according to an embodiment of the present invention. In the example shown in FIG. 1, the secondary battery 100 may include an electrode assembly 110, a first terminal 120, a second terminal 130, a can (or case) 140 and a cap assembly 150.

In one or more embodiments, the can 140 may be provided by blanking and/or notching, bending and welding a metal plate, and may have a substantially hexahedral shape having an opening through which the electrode assembly 110 is inserted and placed and onto which the cap assembly 150 is mounted. In one or more embodiments, the can 140 may include a rectangular bottom portion 141 having long sides and short sides, long side portions 142 and 143 bent and extended from the respective long sides of the bottom portion 141 to the cap assembly 150, and short side portions 144 and 145 extended from the respective short sides of the bottom portion 141 and the long side portions 142 and 143. The can 140 will be described below in more detail.

In FIG. 1, the can 140 and the cap assembly 150 assembled (coupled) to each other are illustrated. As such, the opening, which is a substantially open part of a region of the can 140 corresponding to the cap assembly 150, is not illustrated in FIG. 1. Meanwhile, the interior surface of the can 140 may be subjected to insulation treatment such that the can 140 is insulated from the electrode assembly, the first terminal 120, the second terminal 130 and the cap assembly 150.

Figure 2B:
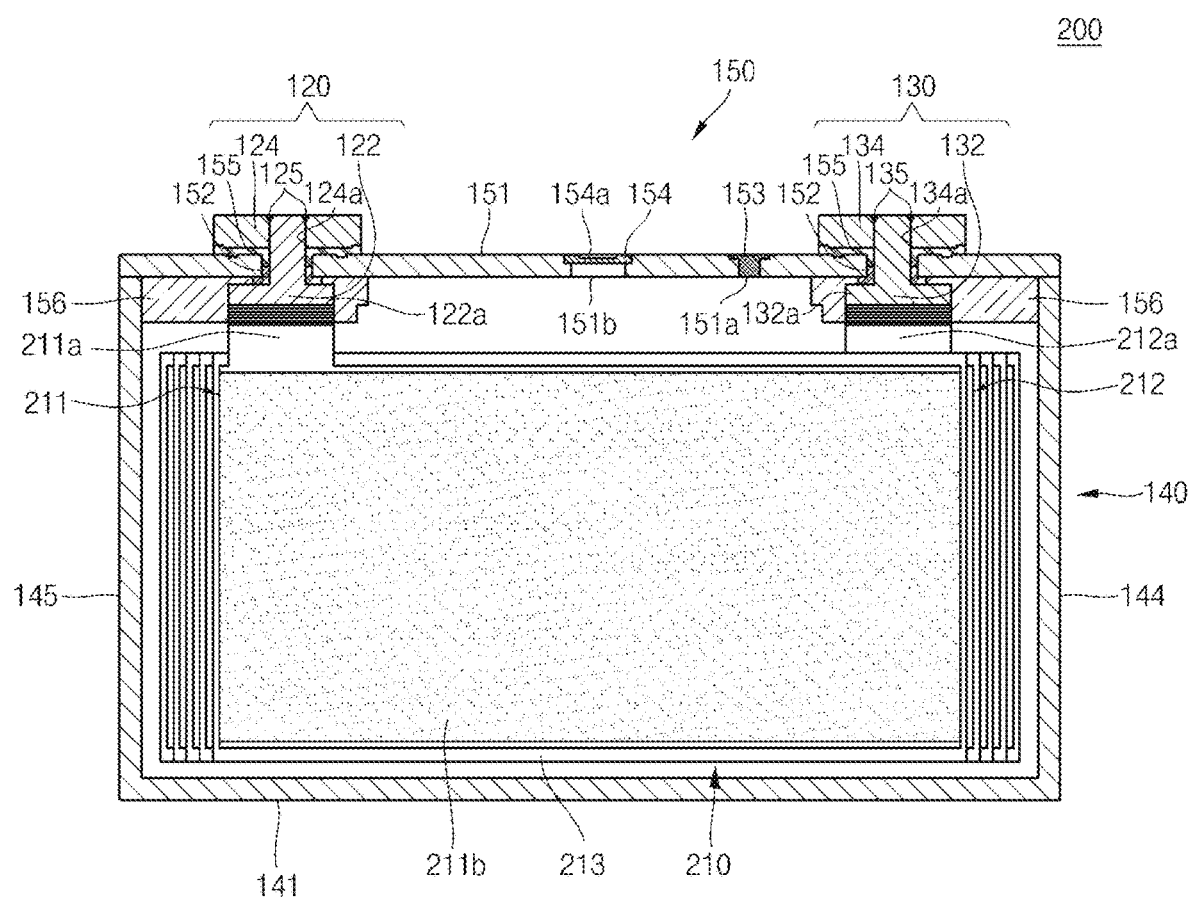

FIGS. 2A and 2B are cross-sectional views illustrating example secondary batteries 100 and 200. In the example shown in FIG. 2A, the secondary battery 100 may include an electrode assembly 110 having a winding axis extending in a horizontal direction (i.e., in a direction substantially parallel with a lengthwise direction of the cap assembly 150). In the example shown in FIG. 2B, the secondary battery 200 may include an electrode assembly 210 having a winding axis extending in a vertical direction (i.e., in a direction substantially perpendicular to the lengthwise direction of the cap assembly 150). In one or more embodiments, the electrode assembly may be a stacked electrode assembly, not a wound electrode assembly.

The secondary battery 100 shown in FIG. 2A will now be described in more detail. The electrode assembly 110 may be formed by winding or stacking a stacked structure including a first electrode plate 111, a separator 113, and a second electrode plate 112, which are thin plates or layers. In one or more embodiments, the first electrode plate 111 may operate as a negative electrode and the second electrode plate 112 may operate as a positive electrode, and vice versa. In one or more embodiments, the first electrode plate 111 may be formed by coating a first active material, such as graphite and/or carbon, on a first electrode collector made of a metal foil, such as copper, a copper alloy, nickel and/or a nickel alloy, and may include a first uncoated portion 111a that is not coated with the first active material. In one or more embodiments, the second electrode plate 112 may be formed by coating a second active material, such as a transition metal oxide, on a second electrode collector made of a metal foil, such as aluminum and/or an aluminum alloy, and may include a second uncoated portion 112a that is not coated with the second electrode material. In one or more embodiments, the separator 113, which is located between the first and second electrode plates 111 and 112, may prevent or reduce short circuits between the first and second electrode plates 111 and 112, and may allow lithium ions to move (e.g., may facilitate the movement of lithium ions). In one or more embodiments, the separator 113 may include polyethylene, polypropylene, or a composite film of polyethylene and polypropylene. In one or more embodiments, the separator 113 may be replaced by an inorganic solid electrolyte, such as a sulfide-based compound, an oxide-based compound, and/or a sulphate compound, not necessitating a liquid- or gel-phase electrolyte solution. The first terminal 120 and the second terminal 130 electrically connected to the first electrode plate 111 and the second electrode plate 112, respectively, are located at opposite ends of the electrode assembly 110. In one or more embodiments, the electrode assembly 110 can be accommodated in the can 140 with an electrolytic solution. In one or more embodiments, the electrolytic solution may include an organic solvent, such as ethylene carbonate (EC), propylene carbonate (PC), diethyl carbonate (DEC), ethyl methyl carbonate (EMC), and/or dimethyl carbonate (DMC), and a lithium salt, such as $LiPF_6$ and/or $LiBF_4$. In one or more embodiments, if the inorganic solid electrolyte is used, the electrolytic solution may be omitted.

The first terminal 120 may be made of a metal and may be electrically connected to the first electrode plate 111. In one or more embodiments, the first terminal 120 may include a first collector plate 121, a first terminal pillar 122 and a first terminal plate 124. In one or more embodiments, the first collector plate 121 may be 178772 brought into contact with the first uncoated portion 111a protruding to one end of the electrode assembly 110. The first collector plate 121 may be welded to the first uncoated portion 111a. In one or more embodiments, the first collector plate 121 may be roughly in an inverted L-shaped ("⌈") configuration and may have a terminal hole 121a located in its top portion. In one or more embodiments, the first terminal pillar 122 may be inserted into the terminal hole 121a, followed by riveting and/or welding. In one or more embodiments, the first collector plate 121 may be made of copper or a copper alloy. In one or more embodiments, the first terminal pillar 122 penetrates (e.g., goes through) the cap plate 151 to be described later and is electrically connected to the first collector plate 121 under the cap plate 151. In addition, in one or more embodiments, the first terminal pillar 122 is upwardly protruded and extended to an upper portion of the cap plate 151 by a set or predetermined length, and a flange 122a may be located below the cap plate 151 to prevent or protect the first terminal pillar 122 from being dislodged from the cap plate 151. A portion of the first terminal pillar 122 positioned below the flange 122a is fitted into the first terminal hole 121a of the first collector plate 121, followed by riveting and/or welding. In one or more embodiments, the first terminal pillar 122 may be electrically insulated from the cap plate 151. In one or more embodiments, boundary regions of the upwardly exposed portion of the first terminal pillar 122 and the first terminal plate 124 may be welded to each other. For example, laser beam may be supplied to the boundary regions of the upwardly exposed portion of the first terminal pillar 122 and the first terminal plate 124 to melt the boundary regions thereof, followed by cooling, thereby welding the boundary regions. The welded regions are designated by reference number 125 in FIG. 2A. Meanwhile, a bus bar made of aluminum or an aluminum alloy may be welded to the first terminal plate 124.

The second terminal 130 may also be made of a metal and may be electrically connected to the second electrode plate 112. In one or more embodiments, the second terminal 130 may include a second collector plate 131, a second terminal pillar 132 and a second terminal plate 134. In one or more embodiments, the second collector plate 131 may be brought into contact with the second uncoated portion 112a protruding to one end of the electrode assembly 110. In one or more embodiments, the second collector plate 131 may be roughly in an inverted L-shaped ("⌉") configuration and may have a terminal hole 131a located in its top portion. In one or more embodiments, the second terminal pillar 132 may be inserted into the terminal hole 131a and then coupled thereto. In one or more embodiments, the second collector plate 131 may be made of, for example, but not limited to, aluminum or an aluminum alloy. In one or more embodiments, the second terminal pillar 132 penetrates (e.g., goes through) the cap plate 151 to be described later and is electrically connected to the second collector plate 131 under the cap plate 151. In addition, in one or more embodiments, the second terminal pillar 132 is upwardly protruded and extended to an upper portion of the cap plate 151 by a set or predetermined length, and a flange 132a may be located below the cap plate 151 to prevent or protect the second terminal pillar 132 from being dislodged from the cap plate 151. A portion of the second terminal pillar 132 positioned below the flange 132a is fitted into the second terminal hole 131a of the second collector plate 131, followed by riveting and/or welding. Here, the second terminal pillar 132 may be electrically insulated from the cap plate 151. In one or more embodiments, the second terminal pillar 132 may be made of aluminum or an aluminum alloy. The second terminal plate 134 has a hole 134a. In one or more embodiments, the second terminal plate 134 is coupled to the second terminal pillar 132. For example, the second terminal pillar 132 is coupled to the edges of the hole 134a of the second terminal plate 134. In one or more embodiments, the second terminal pillar 132 and the second terminal plate 134 may be rivetted and/or welded to each other. In one or more embodiments, boundary regions of the upwardly exposed portion of the second terminal pillar 132 and the second terminal plate 134 may be welded to each other. For example, laser beam may be supplied to the boundary regions of the upwardly exposed portion of the second terminal pillar 132 and the second terminal plate 134 to melt the boundary regions, followed by cooling, thereby welding the boundary regions. The welded regions are designated by reference number 135 in FIG. 2A. Meanwhile, a bus bar made of aluminum or an aluminum alloy may be easily welded to the second terminal plate 134. Here, the second terminal plate 134 may be electrically connected to the cap plate 151. Thus, the cap plate 151 and the can 140 may have the same polarity as the second terminal 130 (e.g., a positive polarity).

The cap assembly 150 may be coupled to the can 140. In one or more embodiments, the cap assembly 150 may include the cap plate 151, a seal gasket 152, a plug 153, a safety vent 154, an upper coupling member 155 and a lower insulating member 156. The cap plate 151 may seal the opening of the case 140, and may be made of the same material as the case 140. In one or more embodiments, the cap plate 151 may be coupled to the can 140 by laser welding. In the embodiments in which the cap plate 151 has the same polarity as the second terminal 130, the cap plate 151 and the can 140 may have the same polarity. The seal gasket 152 made of an insulating material may be located between each of the first terminal pillar 122 and the second terminal pillar 132 and the cap plate 151 at a bottom end of the cap plate 151 and may seal regions between each of the first terminal pillar 122 and the second terminal pillar 132 and the cap plate 151. The seal gasket 152 may prevent or reduce external moisture from permeating into the secondary battery 100 or prevent or reduce the electrolyte accommodated in the secondary battery 100 from being effused outside. The plug 153 may seal an electrolyte injection hole 151a of the cap plate 151. The safety vent 154 may be installed in a vent hole 151b of the cap plate 151 and may have a notch 154a configured to be openable at a preset (or set) pressure. The upper coupling member 155 may be located between each of the first terminal pillar 122 and the second terminal pillar 132 and the cap plate 151 at a top end of the cap plate 151. The upper coupling member 155 may closely contact the cap plate 151. In addition, the upper coupling member 155 may also closely contact and the seal gasket 152. The upper coupling member 155 may insulate the first terminal pillar 122 and the second terminal pillar 132 from the cap plate 151. In one or more embodiments, the upper coupling member 155 located in the second terminal pillar 132 may electrically connect the second terminal plate 134 and the cap plate 151 to each other. Accordingly, the second terminal 130 may have the same polarity as the cap plate 151 and the can 140. The lower insulating member 156 may be located between each of the first collector plate 121 and the second collector plate 131 and the cap plate 151 and may prevent or reduce an unnecessary short circuit from being generated. That is , the lower insulating member 156 may prevent or reduce short circuits from being generated between the first collector plate 121 and the cap plate 151 and between the second collector plate 131 and the cap plate 151.

The secondary battery 200 shown in FIG. 2B will now be described. The secondary battery 200 is different from the secondary battery 100 in terms of the construction of the electrode assembly 210 and the connection relationships between the electrode assembly 210 and each of the terminals 120 and 130. A first electrode tab 211a may be positioned between the electrode assembly 210 and a first terminal pillar 122 of a first terminal 120, and a second electrode tab 212a may be positioned between the electrode assembly 210 and a second terminal pillar 132 of a second terminal 130. Specifically, the first electrode tab 211a may be extended from a top end of the electrode assembly 210 to a bottom end of the first terminal pillar 122 of the first terminal 120 to then be electrically connected or welded to a planar flange 122a provided in the first terminal pillar 122. The second electrode tab 212a may be extended from a top end of the electrode assembly 210 to a bottom end of the second terminal pillar 132 of the second terminal 130 to then be electrically connected or welded to a planar flange 132a provided in the second terminal pillar 132. The first electrode tab 211a may be either a first uncoated portion of the first electrode plate 211 of the electrode assembly 210, which is not coated with a first active material 211b, or a separate member connected to the first uncoated portion. Here, the first uncoated portion may be made of the same material as the first electrode plate 211, and a material for the separate member may be one selected from the group consisting of nickel, a nickel alloy, copper, a copper alloy, aluminum, an aluminum alloy, and equivalents thereof. The second electrode tab 212a may be either a second uncoated portion of the second electrode plate 212 of the electrode assembly 210, which is not coated with a second active material, or a separate member connected to the second uncoated portion. Here, the second uncoated portion may be made of the same material as the second electrode plate 212, and a material for the separate member may be one selected from the group consisting of aluminum, an aluminum alloy, nickel, a nickel alloy, copper, a copper alloy, and equivalents thereof.

As described above, since a winding axis of the electrode assembly 210 and terminal axes of the terminals 120 and 130 are parallel or horizontal with each other, the electrode assembly 210 has excellent electrolyte impregnation capability when an electrolyte is injected, and internal gases are rapidly transferred to a safety vent 154 during overcharging to make the safety vent 154 quickly operate. In addition, electrode tabs (uncoated portions or separate members) of the electrode assembly 210 are directly electrically connected to the terminals 120 and 130, which shortens electrical paths, thereby reducing internal resistance of the secondary battery 100 while reducing the number of components of the secondary battery 100.

FIGS. 3A to 3E are perspective views or cross-sectional views illustrating an example method for manufacturing example secondary batteries 100 and 200. FIG. 5 shows a photograph of a can of the example secondary battery 100, 200 manufactured by the method shown in FIGS. 3A to 3E.

Figure 3A:
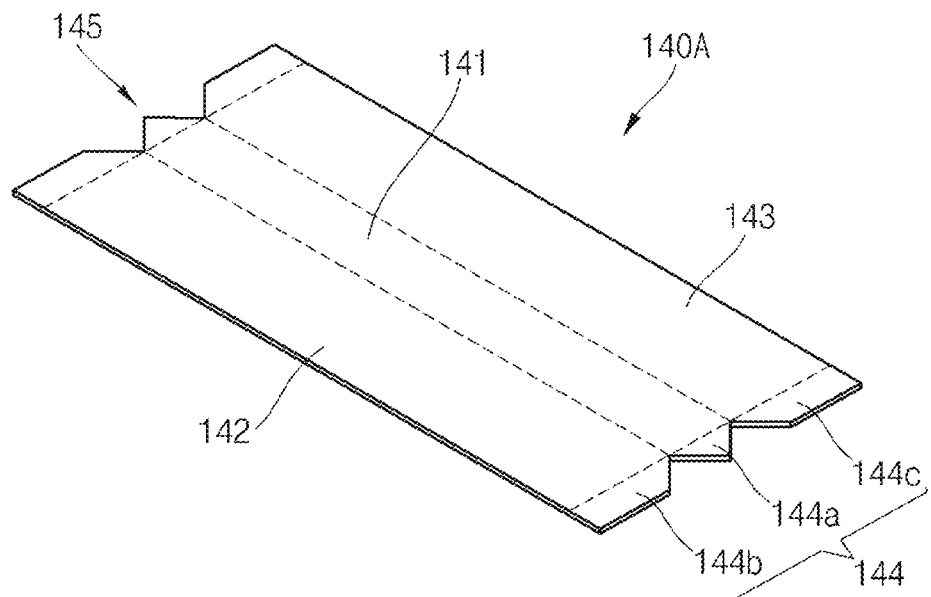
FIGS. 3A to 3E are perspective views or cross-sectional views illustrating an example method for manufacturing an example secondary battery.

FIG. 3A shows a can at an initial stage of manufacture. In the example shown in FIG. 3A, a substantially planar metal plate 140A having a substantially uniform thickness may be provided using a blanking process and/or a notching process. In one or more embodiments, the metal plate 140A may include a substantially rectangular bottom portion 141 having long sides and short sides, long side portions 142 and 143 horizontally extending from the respective long sides of the bottom portion 141, and short side portions 144 and 145 horizontally extending from the bottom portion 141 and the respective long side portions 142 and 143. In one or more embodiments, one of the short side portions 144 may include a first short side portion 144a extending from the short side of the bottom portion 141 in a substantially triangular shape, a second short side portion 144b horizontally extending from one of the long side portions 142 and 143, and a third short side portion 144c horizontally extending from the other of the long side portions 142 and 143. Here, the second short side portion 144b may include an inclined periphery (e.g., an inclined side) facing the first short side portion 144a, and the third short side portion 144c may also include an inclined periphery (e.g., an inclined side) facing the first short side portion 144a. In other words, the second and third short side portions 144b and 144c may be configured to match (align) with the first short side portion 144a when the can 140 is assembled. The length of each of the long side portions 142 and 143 (in a length direction of the battery) may be substantially equal to that of each of the long sides of the bottom portion 141. In addition, the width of the first short side portion 144a (in a width direction of the battery) may be substantially equal to that of each of the short sides of the bottom portion 141. The overall width of the second and third short side portions 144b and 144c (measured in the width direction of the battery after the can 140 is assembled) may be substantially equal to the width of each of the short sides of the bottom portion 141. In addition, the height of each of the long side portions 142 and 143 (measured in a height direction of the battery after the can 140 is assembled)

may be substantially equal to that of each of the short side portions 144 and 145. In FIG. 3A, dotted lines indicate bending lines in a subsequent process to be described later.

In one or more embodiments, the metal plate 140A may include aluminum (Al), iron (Fe), copper (Cu), titanium (Ti), nickel (Ni), magnesium (Mg), chrome (Cr), manganese (Mn), zinc (Zn) or one or more alloys of any of these elements. In one or more embodiments, the metal plate 140A may include nickel (Ni) plated iron (Fe) and/or SUS (e.g., SUS 301, SUS 304, SUS 305, SUS 316L, and/or SUS 321).

In one or more embodiments, the metal plate 140A may have a thickness in the range from approximately (about) 0.1 mm to approximately (about) 10 mm, and a deviation in the thickness of the metal plate 140A in all areas may be in the range from approximately (about) 0.1% to approximately (about) 1%. Therefore, embodiments of the present invention may provide the can 140 that is relatively thin and has a small thickness deviation, compared to the conventional can.

In one or more embodiments, the metal plate 140A may be preprocessed to facilitate a bending process and/or a welding process, which will be described below. In one or more embodiments, the metal plate 140A may be subjected to annealing treatment performed in a predetermined gas atmosphere and a predetermined (or set) temperature range for a predetermined (or set) period of time. In one or more embodiments, the annealing treatment may be performed in an atmosphere of inert gas, such as argon (Ar) and/or nitrogen ($N_2$), at a temperature ranging from approximately (about) 300° C. to approximately (about) 1000° C. for approximately (about) 10 seconds to approximately (about) 60 minutes. The annealing treatment may increase the elongate of the metal plate 140A by approximately (about) 5% to approximately (about) 60%. Accordingly, the bending process of the metal plate 140A may be easily performed, and occurrence of a spring-back phenomenon can be minimized particularly after the bending process.

In one or more embodiments, the metal plate 140A may have a substantially planar top surface and a substantially planar bottom surface. The top surface of the metal plate 140A may be subjected to insulation treatment. In one or more embodiments, a thin insulation film may be located on the top surface of metal plate 140A by forming a thin oxide layer (e.g., an anodizing layer) through a metal oxidation process or coating or laminating an insulation resin (e.g., polyimide, polypropylene and/or polyethylene). In one or more embodiments, the top surface of the metal plate 140A may correspond to the interior surface of the can 140, and the bottom surface of the metal plate 140A may correspond to the exterior surface of the can 140. These features of the metal plate 140A may be commonly applied to all of the metal plates disclosed in the following embodiments.

Figure 3B:
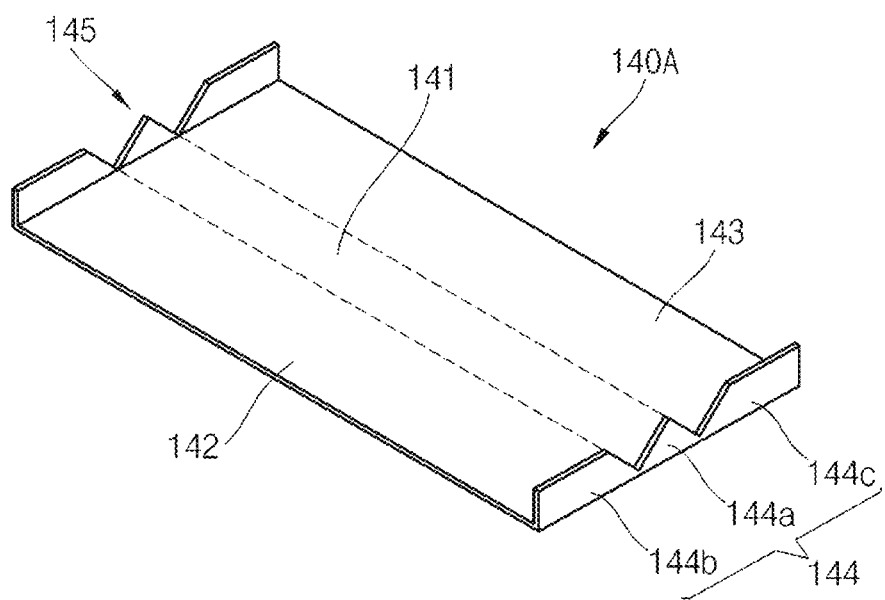

FIG. 3B shows a can 140 at a later stage of manufacture. In the example shown in FIG. 3B, the metal plate 140A may be bent in a set or predetermined shape. In one or more embodiments, the metal plate 140A may be bent in a set or predetermined shape after it is fixed by a bending machine or a press mold.

In one or more embodiments, the long side portions 142 and 143 bent and extended from the respective long sides of the bottom portion 141 in a substantially perpendicular (normal) direction (with respect to the bottom portion 141), and the short side portions 144 and 145 bent and extended from the bottom portion 141 and the long side portions 142 and 143 in a substantially perpendicular (normal) direction (with respect to the bottom portion 141 and the long side portions 142 and 143), may be provided as the result of the bending process. For example, the long side portions 142 and 143 may be bent approximately (about) 90 degrees from the long sides of the bottom portion 141 to then be extended, and the short side portions 144 and 145 may be bent approximately (about) 90 degrees from the short sides of the bottom portion 141 to then be extended and may be bent approximately (about) 90 degrees from the long side portions 142 and 143 to then be extended.

Therefore, the first short side portion 144a, the second short side portion 144b and the third short side portion 144c may be positioned to face one another, and their peripheries (outer edges) may be matched (aligned) with one another and/or may contact one another. Here, an angle between the upper periphery of the first short side portion 144a and the short side of the bottom portion 141 may be in the range from approximately (about) 40 degrees to approximately (about) 50 degrees, for example, 45 degrees. In addition, an angle between the periphery of the first short side portion 144a facing the second short side portion 144b or the third short side portion 144c, and the periphery of the respective one of the second and third short side portions 144b and 144c facing the first short side portion 144a may be in the range from approximately (about) 80 degrees to approximately (about) 100 degrees, for example, 90 degrees.

In one or more embodiments, an angle defined between each of two upper peripheries of the first short side portion 144a and the short side of the bottom portion 141 may be in the range from approximately (about) 40 degrees to approximately (about) 50 degrees, preferably 45 degrees, an angle defined between the periphery of the second short side portion 144b facing one periphery of the first short side portion 144a and the long side portion 142 may be in the range from approximately (about) 40 degrees to approximately (about) 50 degrees, preferably 45 degrees, and the periphery of the third short side portion 144c facing the other periphery of the first short side portion 144a and the long side portion 143 may be in the range from approximately (about) 40 degrees to approximately (about) 50 degrees, preferably 45 degrees. Accordingly, a vertex at which the bottom portion 141, the one long side portion 142, the first short side portion 144a and the second short side portion 144b meet, and a vertex at which the bottom portion 141, the long side portion 143, the first short side portion 144a and the third short side portion 144c meet, may be bent in a substantially round shape.

Meanwhile, FIG. 3B shows an example in which the short side portion 144 (or 145) is bent from the bottom portion 141 and the long side portion 142 (or 143). That is, FIG. 3B shows an example in which the long side portion 142 has yet to be bent from the bottom portion 141.

Figure 3C:
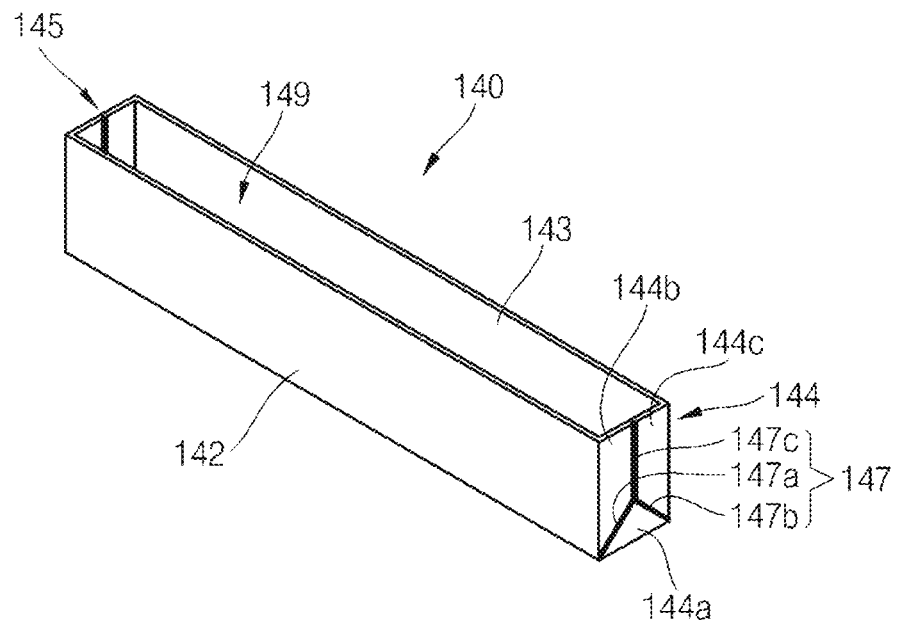
Figure 3D:
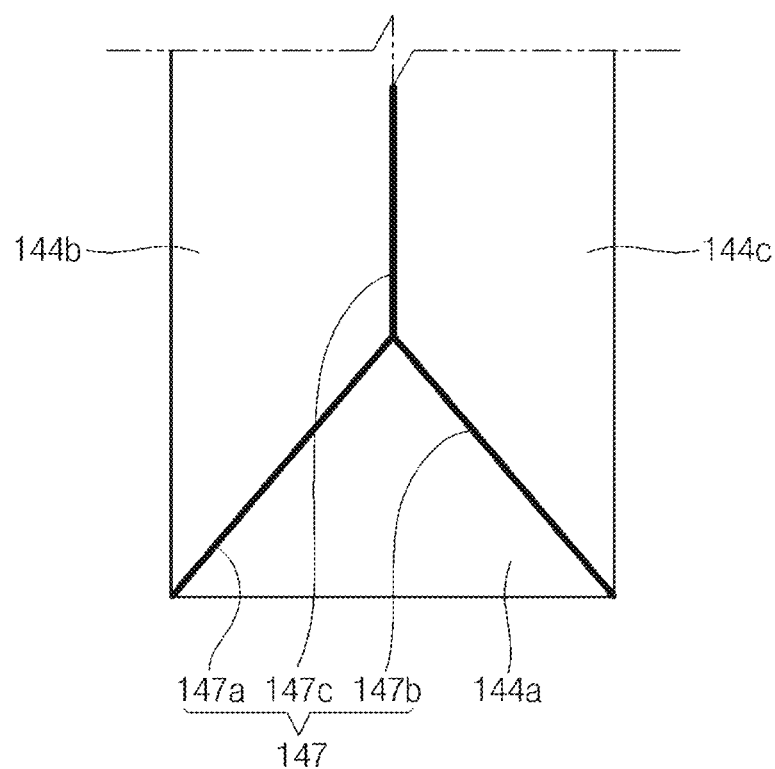
Figure 3E:
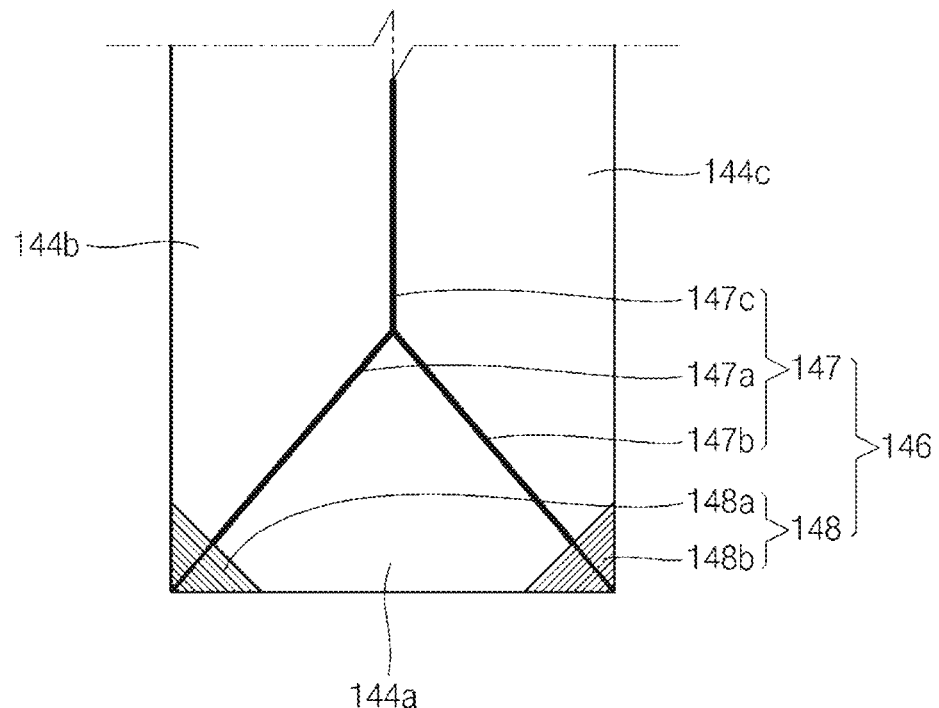

FIGS. 3C to 3E show the can 140 at later stages of manufacture. In the example shown in FIGS. 3C to 3E, a welding process may be performed. In one or more embodiments, the welding portions 146 may be located in the short side portions 144 and 145. The welding portions 146 may include main welding portions 147 and auxiliary welding portions 148. In one or more embodiments, the welding portions 146 are first formed on the side portions 144 and 145, as shown in FIGS. 3C and 3D, and the auxiliary welding portions 148 may then be formed, as shown in FIG. 3E. In one or more embodiments, the main welding portions 147 may be welded as line welds, and the auxiliary welding portions 148 may be welded as side welds.

Referring to FIGS. 3C and 3D, the main welding portions 147 may include a first welding portion 147a located at a boundary region between a first short side portion 144a and a second short side portion 144b, a second welding portion 147b located at a boundary region between the first short side portion 144a and a third short side portion 144c, and a third welding portion 147c located at a boundary region between the second short side portion 144b and the third short side portion 144c.

In other words, the first welding portion 147a may have an acute angle at a vertex, where the bottom portion 141, the long side portion 142, and the first short side portion 144a meet, with respect to a short side of the bottom portion 141, and the second welding portion 147b may have an acuter angle at a vertex, where the bottom portion 141, the long side portion 143, and the first short side portion 144a meet, with respect to the short side of the bottom portion 141. In addition, the third welding portion 147c may be extended from bottom ends of the second and third short side portions 144b and 144c to top ends (i.e., to an opening 149) of the second and third short side portions 144b and 144c.

In one or more embodiments, the first and second welding portions 147a and 147b may be consecutively formed, and the third welding portion 147c may then be formed, and vice versa. In one or more embodiments, the welding process may be performed on the first welding portion 147a, the third welding portion 147c and the second welding portion 147b in that order, but the welding order may be reversed. In one or more embodiments, the welding process performed on the third welding portion 147c may be started from a bottom end of the third welding portion 147c and may be terminated at the top end, and vice versa. In one or more embodiments, the main welding portions 147 may include a butt joint structure, a lap joint structure, a cover joint structure and/or an edge joint structure. In one or more embodiments, the main welding portions 147 may be in a substantially inverted Y-shaped ("入") configuration.

The main welding portions 147 may be indicated by solid lines. Therefore, the first short side portion 144a may be perfectly (suitably) and securely fixed to the second and third short side portions 144b and 144c owing to the first and second welding portions 147a and 147b, and the second and third short side portions 144b and 144c (or the second short side portions 144b and 144c) may be perfectly (suitably) and securely fixed to each other by the third welding portion 147c.

Referring to FIGS. 3E and 5, the auxiliary welding portions 148 may be located at opposite bottom corners of the short side portions 144 and 145 of the can 140. For example, the auxiliary welding portions 148 may include a fourth welding portion 148a located across the first welding portion 147a at a corner of the can 140, where the first short side portion 144a and the second short side portion 144b meet, and a fifth welding portion 148b located across the second welding portion 147b at a corner of the can 140, where the first short side portion 144a and the third short side portion 144c meet.

The fourth welding portion 148a is located at one corner of each of the short side portions 144 and 145. In one or more embodiments, the fourth welding portion 148a may be in a substantially triangular shape. In one or more embodiments, the fourth welding portion 148a may be created while reciprocating laser beams travel in a zigzag pattern between a bending line defined by the bottom portion 141 and the first short side portion 144a and a bending line defined by the long side portion 142 and the second short side portion 144b. In other words, the fourth welding portion 148a may include multiple welding lines. Here, since the laser beams move over and over across the first welding portion 147a between the first short side portion 144a and the second short side portion 144b to create the fourth welding portion 148a, the fourth welding portion 148a can more securely and perfectly (suitably) weld the corner of the can 140 in a region of the first welding portion 147a. That is, since overlap welding (dual welding) is performed on the corner of the can 140 in the boundary region between the first short side portion 144a and the second short side portion 144b by the first welding portion 147a and the fourth welding portion 148a, internal pores and welding cracks can be removed (or reduced), thereby improving the sealing efficiency of the can 140.

The fifth welding portion 148b is located at the other corner of each of the short side portions 144 and 145. In one or more embodiments, the fifth welding portion 148b may be in a substantially triangular shape. In one or more embodiments, the fifth welding portion 148b may be created while reciprocating laser beams travel in a zigzag pattern between a bending line defined by the bottom portion 141 and the first short side portion 144a and a bending line defined by the long side portion 143 and the third short side portion 144c. In other words, the fifth welding portion 148b may include multiple welding lines. Here, since the laser beams move over and over across the second welding portion 147b between the first short side portion 144a and the third short side portion 144c to create the fifth welding portion 148b, the fifth welding portion 148b can more securely and perfectly (suitably) weld the corner of the can 140 in a region of the second welding portion 147b. That is, since overlap welding (dual welding) is performed on the corner of the can 140 in the boundary region between the first short side portion 144a and the third short side portion 144c by the second welding portion 147b and the fifth welding portion 148b, the sealing efficiency of the can 140 can be improved by removing (or reducing) internal pores and welding cracks. In one or more embodiments, the fourth welding portion 148a may first be formed and the fifth welding portion 148b may then be formed, and vice versa.

As described above, one or more embodiments of the present invention provide the can 140 configured such that the first short side portion 144a is bent and extended from the bottom portion 141, the second and third short side portions 144b and 144c are bent and extended from the long side portions 142 and 143, and the first, second and third short side portions 144a, 144b and 144c are connected to one another through the main welding portions 147 and the auxiliary welding portions 148 to construct one single short side portion 144, thereby increasing bending and welding workability, and improving sealing efficiency to prevent (or reduce) leakage of electrolyte.

Here, since the first short side portion 144a is bent and extended from the corresponding edge of the bottom portion 141, a welding process is not necessarily performed between the edge of the bottom portion 141 corresponding to (adjacent to) the first short side portion 144a and the first short side portion 144a. In one or more embodiments, since the second and third short side portions 144b and 144c are bent and extended from the corresponding long side portions 142 and 143, respectively, a welding process is not necessarily needed to be performed between the edges of the long side portions 142 and 143 corresponding to the second and third short side portions 144b and 144c and the second and third short side portions 144b and 144c. These configurations can be commonly applied to between the long side portions 142 and 143 and another short side portion 145.

Figure 4A:
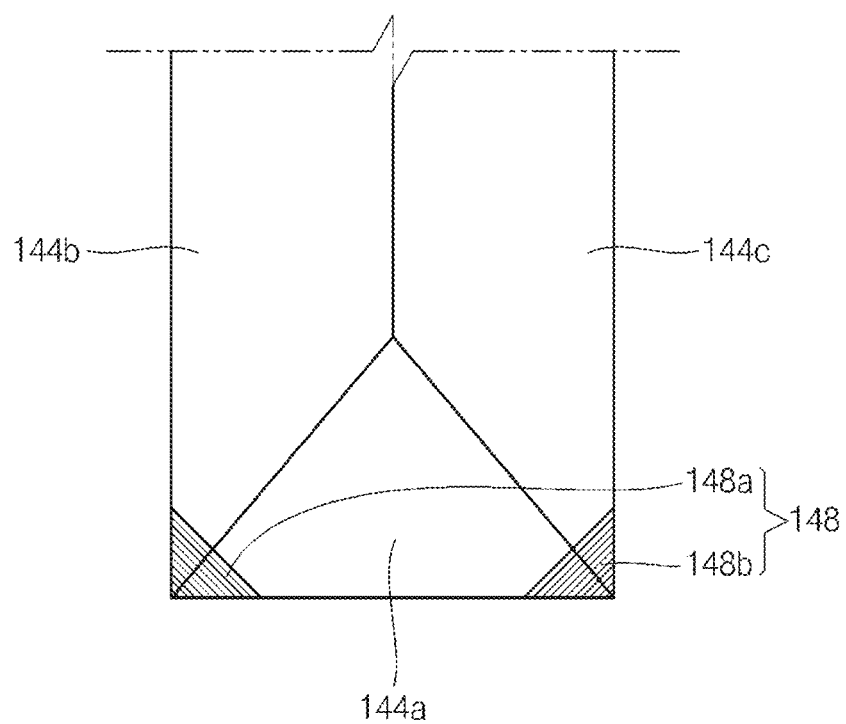

FIGS. 4A and 4B are side views illustrating an example method for manufacturing example secondary batteries 100 and 200. In the example shown in FIGS. 4A and 4B, a welding process may be performed.

In one or more embodiments, welding portions 146 may be located in short side portions 144 and 145. The welding portions 146 may include main welding portions 147 and auxiliary welding portions 148. In one or more embodiments, the auxiliary welding portions 148 are first formed in the side portions 144 and 145, as shown in FIG. 4A, and the main welding portions 147 may then be formed, as shown in FIG. 4B. In one or more embodiments, the main welding portions 147 may be welded as line welds, and the auxiliary welding portions 148 may be welded as side welds.

Referring to FIG. 4A, the auxiliary welding portions 148 may be located at opposite corners in each of the short side portions 144 and 145 of the can 140. The auxiliary welding portions 148 may include a fourth welding portion 148a located across a boundary region between the first short side portion 144a and the second short side portion 144b at a corner of the can 140, where the first short side portion 144a and the second short side portion 144b meet, and a fifth welding portion 148b located across a boundary region between the first short side portion 144a and the third short side portion 144c at a corner of the can 140, where the first short side portion 144a and the third short side portion 144c meet.

The fourth welding portion 148a may be located at one corner of each of the short side portions 144 and 145. In one or more embodiments, the fourth welding portion 148a may be in a substantially triangular shape. In one or more embodiments, the fourth welding portion 148a may be created while reciprocating laser beams travel in a zigzag pattern between a bending line defined by the bottom portion 141 and the first short side portion 144a and a bending line defined by the long side portion 142 and the second short side portion 144b. In other words, the fourth welding portion 148a may include multiple welding lines. Here, since the laser beams move over and over across a boundary between the first short side portion 144a and the second short side portion 144b to create the fourth welding portion 148a, the fourth welding portion 148a can more securely and perfectly (suitably) weld the corner of the can 140.

The fifth welding portion 148b may be located at the other corner of each of the short side portions 144 and 145. In one or more embodiments, the fifth welding portion 148b may be in a substantially triangular shape. In one or more embodiments, the fifth welding portion 148b may be created while reciprocating laser beams travel in a zigzag pattern between a bending line defined by the bottom portion 141 and the first short side portion 144a and a bending line defined by the long side portion 143 and the third short side portion 144c. In other words, the fifth welding portion 148b may include multiple welding lines. Here, since the laser beams move over and over across a boundary between the first short side portion 144a and the third side portion 144c to create the fifth welding portion 148b, the fifth welding portion 148b can more securely and perfectly (suitably) weld the corner of the can 140. In one or more embodiments, the fourth welding portion 148a may first be formed and the fifth welding portion 148b may then be formed, and vice versa.

Referring to FIG. 4B, the main welding portions 147 may include a first welding portion 147a located at a boundary region between a first short side portion 144a and a second short side portion 144b, a second welding portion 147b located at a boundary region between the first short side portion 144a and a third short side portion 144c, and a third welding portion 147c located at a boundary region between the second short side portion 144b and the third short side portion 144c.

In other words, the first welding portion 147a may have an acute angle at a vertex, where the bottom portion 141, the long side portion 142, and the first short side portion 144a meet, with respect to a short side of the bottom portion 141, and the second welding portion 147b may have an acuter angle at a vertex, where the bottom portion 141, the long side portion 143, and the first short side portion 144a meet, with respect to the short side of the bottom portion 141. In one or more embodiments, the third welding portion 147c may be extended from bottom ends of the second and third short side portions 144b and 144c to top ends of the second and third short side portions 144b and 144c (i.e., to an opening 149).

In one or more embodiments, the first welding portion 147a may be overlapped with a portion of the fourth welding portion 148a. In other words, since overlap welding is performed on the corner of the can 140 in the boundary region between the first short side portion 144a and the second short side portion 144b by the first welding portion 147a and the fourth welding portion 148a, internal pores and welding cracks can be removed (or reduced), thereby improving the sealing efficiency of the can 140.

The second welding portion 147b may be overlapped with a portion of the fifth welding portion 148b. In other words, since overlap welding is performed on a corner of the can 140 in the boundary region between the first short side portion 144a and the third short side portion 144c by the second welding portion 147b and the fifth welding portion 148b, internal pores and welding cracks can be removed (or reduced), thereby improving the sealing efficiency of the can 140.

FIGS. 6A to 6D are side views or cross-sectional views illustrating an example method for manufacturing an example secondary battery. In the example shown in FIGS. 6A to 6D, a welding process may be performed.

In one or more embodiments, welding portions 246 may be located in each of the short side portions 144 and 145. The welding portions 246 may include main welding portions 147 and auxiliary welding portions 248. In one or more embodiments, the main welding portions 147 may be welded as line welds, and the auxiliary welding portions 248 may be welded as side welds.

Figure 6A:
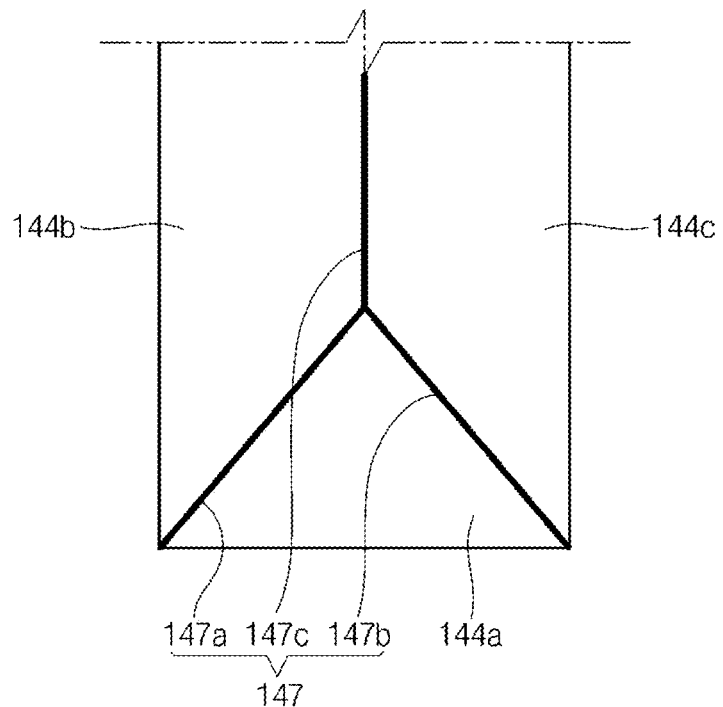
FIGS. 6A to 6D are side views or cross-sectional views illustrating an example method for manufacturing an example secondary battery.

Referring to FIG. 6A, the main welding portions 147 may include a first welding portion 147a located at a boundary region between a first short side portion 144a and a second short side portion 144b, a second welding portion 147b located at a boundary region between the first short side portion 144a and a third short side portion 144c, and a third welding portion 147c located at a boundary region between the second short side portion 144b and the third short side portion 144c. Since the configurations and features of the main welding portions 147 are substantially the same as those of the main welding portions 147 shown in FIG. 3D, detailed descriptions thereof will not be given.

Figure 6B:
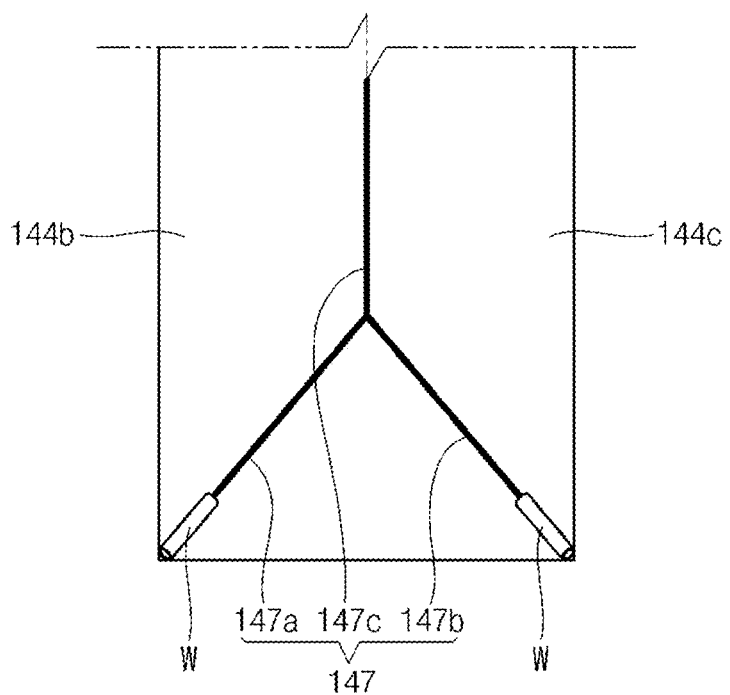
Figure 6C:
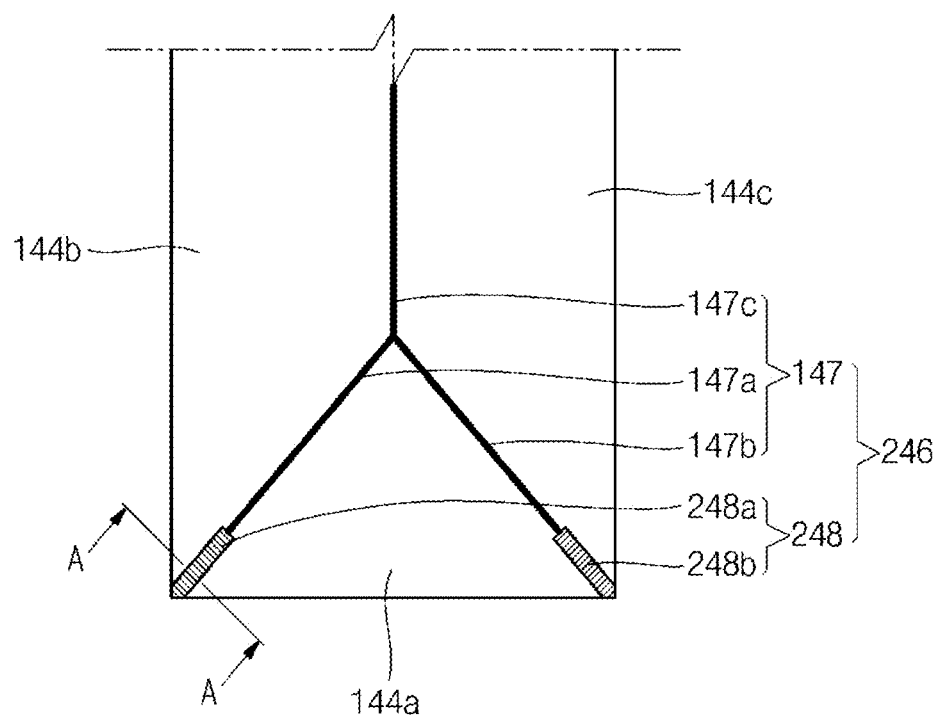

Referring to FIGS. 6B and 6C, overlay-welding or brazing-welding may be performed on corners of the can 140 in regions of the first welding portion 147a and the second welding portion 147b using a metal wire W, thereby forming the auxiliary welding portions 248. The metal wire W may be made of a material that is more easily melted than the can 140. For example, the metal wire W may be an aluminum wire. The auxiliary welding portions 248 may include a fourth welding portion 248a located at a bottom end of the first welding portion 147a, and a fifth welding portion 248b located at a bottom end of the second welding portion 147b. In other words, the fourth welding portion 248a may be located at the corner of the can 140, where the first short side portion 144a and the second short side portion 144b meet, and the fifth welding portion 248b may be located at the corner of the can 140, where the first short side portion 144a and the third short side portion 144c meet.

Figure 6D:
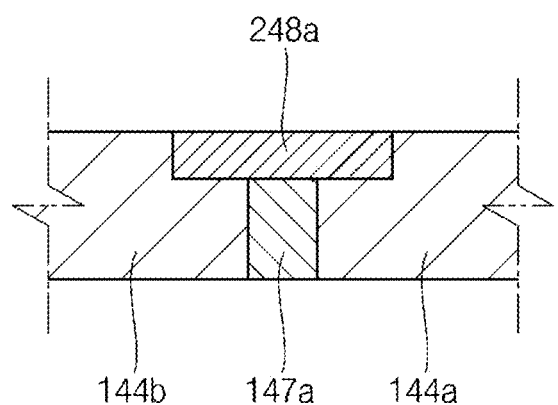

The fourth welding portion 248a may be located at one side (corner) of the short side portion 144a. In one or more embodiments, the fourth welding portion 248a may be overlapped with the first welding portion 147a and may have a larger width than the first welding portion 147a. Since the fourth welding portion 248a fills a boundary interface between the first short side portion 144a and the second short side portion 144b by additionally welding the metal wire W to the first welding portion 147a, the first welding portion 147a, specifically the corner of the can 140, can be more securely and perfectly (suitably) welded. That is, since the corner of the can 140 in the boundary region between the first short side portion 144a and the second short side portion 144b is overlap-welded by the first welding portion 147a and the fourth welding portion 248a (e.g., to form an overlap-welded portion), internal pores and welding cracks can be removed (or reduced), thereby improving the sealing efficiency of the can 140. In one or more embodiments, as shown in FIG. 6D, after the metal wire W is overlay-welded to the first welding portion 147a, a surface polishing process may further be performed to planarize the fourth welding portion 248a.

The fifth welding portion 248b may be located at the other side (corner) of the short side portion 144a. In one or more embodiments, the fifth welding portion 248b may be overlapped with the second welding portion 147b and may have a larger width than the second welding portion 147b. Since the fifth welding portion 248b fills a boundary interface between the first short side portion 144a and the third short side portion 144c by additionally welding the metal wire W to the second welding portion 147b, the second welding portion 147b, specifically the corner of the can 140, can be more securely and perfectly (suitably) welded. That is, since the corner of the can 140 in the boundary region between the first short side portion 144a and the third short side portion 144c is overlap-welded by the second welding portion 147b and the fifth welding portion 248b, internal pores and welding cracks can be removed (or reduced), thereby improving the sealing efficiency of the can 140.

As used herein, the terms "use," "using," and "used" may be considered synonymous with the terms "utilize," "utilizing," and "utilized," respectively.

In addition, the terms "substantially," "about," "approximately," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein While the secondary battery of the embodiments of present invention has been particularly shown and described with reference to example embodiments thereof, it will be understood by those of ordinary skill in the art that various changes in form and details may be made therein without departing from the spirit and scope of the present invention as defined by the following claims and their equivalents.

What is claimed is:

1. A secondary battery comprising:
   an electrode assembly;
   a case configured to accommodate the electrode assembly, the case comprising a bottom portion, long side portions, and short side portions, at least one of which comprises a welding portion and is bent and welded; and
   a cap plate coupled to the case,
   wherein each of the short side portions is configured by combining a first short side portion bent and extended from the bottom portion and second and third short side portions extending from a respective one of the long side portions,
   wherein the welding portion comprises main welding portions and auxiliary welding portions overlapped with portions of the main welding portions, and the auxiliary welding portions are respectively located at a first corner of the case, where the first short side portion and the second short side portion meet, and at a second corner of the case, where the first short side portion and the third short side portion meet, and
   wherein each of the auxiliary welding portions comprises welding lines overlapping the corresponding main welding portion in a plan view and crossing an extension direction of the corresponding main welding portion.

2. The secondary battery of claim 1, wherein the long side portions are configured to be bent and extended from the bottom portion.

3. The secondary battery of claim 2, wherein the main welding portions comprise a first welding portion between the first short side portion and the second short side portion, a second welding portion between the first short side portion and the third short side portion, and a third welding portion between the second short side portion and the third short side portion.

4. The secondary battery of claim 3, wherein the auxiliary welding portions comprise a fourth welding portion located across the first welding portion and a fifth welding portion located across the second welding portion.

5. The secondary battery of claim 2, wherein the auxiliary welding portions are each formed by welding a metal wire to overlap a portion of the corresponding main welding portion.

6. The secondary battery of claim 2, wherein the main welding portions are welded as line welds and the auxiliary welding portions are welded as side welds, the side welds comprising multiple welding lines overlapping the main welding portion in a plan view and crossing an extension direction of the main welding portion.

7. A method of manufacturing the secondary battery of claim 1, the method comprising:
   providing the electrode assembly;
   accommodating the electrode assembly in the case, the case comprising long side portions and short side portions;
   bending the at least one of the long side portions and short side portions;

overlap-welding the at least one of the long side portions and short side portions at the welding portion; and
coupling the cap plate to the case.

\* \* \* \* \*

UNITED STATES PATENT AND TRADEMARK OFFICE
CERTIFICATE OF CORRECTION

PATENT NO. : 11,670,824 B2
APPLICATION NO. : 16/749301
DATED : June 6, 2023
INVENTOR(S) : Dae Sik Oh et al.

It is certified that error appears in the above-identified patent and that said Letters Patent is hereby corrected as shown below:

In the Claims
Column 16, Line 31, Claim 1 After "comprises" insert -- multiple --

Signed and Sealed this
Eighth Day of August, 2023

Katherine Kelly Vidal
*Director of the United States Patent and Trademark Office*